United States Patent Office 3,472,792
Patented Oct. 14, 1969

3,472,792
HYDROCARBON CONVERSION CATALYST
Kenneth D. Vesely, La Grange Park, and Edward Michalko, Chicago, Ill., assignors to Universal Oil Products Company, Des Plaines, Ill., a corporation of Delaware
No Drawing. Filed Mar. 13, 1967, Ser. No. 622,471
Int. Cl. B01j 11/40
U.S. Cl. 252—451          9 Claims

ABSTRACT OF THE DISCLOSURE

A catalyst manufacturing process. The catalyst is a faujasite dispersed in an amorphous silica-alumina matrix. The catalyst is manufactured by adding the faujasite together with the mother liquor from which is was precipitated to a silica sol and then effecting gelation of the sol. The gel is then impregnated with a partially hydrolyzed aluminum sulfate and the aluminum sulfate subsequently precipitated by completing the hydrolysis thereof.

BACKGROUND OF THE INVENTION

For many years heavy petroleum hydrocarbon feed stocks boiling in excess of about 400° F. have been converted to lower boiling hydrocarbons in the motor fuel boiling range by heating them at a temperature in the 600° F.–1100° F. range in contact with an amorphous silica-alumina catalyst. While other silica composites, e.g., silica-zirconia, silica-magnesia, etc., have been known to catalyze the cracking reaction, the silica-alumina composite has been by far the most widely accepted catalyst in the industry. More recently, improved catalysts have been prepared by the inclusion of certain finely divided crystalline aluminosilicates, particularly the synthetically prepared faujasites, within the amorphous silica-alumina matrix.

The art discloses a number of methods applicable to the preparation of the catalyst herein contemplated, all of which require the recovery of the faujasite as a finished product prior to distribution thereof in a siliceous matrix. For example, it is the common practice to prepare the faujasite by the method whereby an appropriate mixture of oxides, or of materials, whose composition can be completely represented as a mixture of the oxides $SiO_2$, $Al_2O_3$, $Na_2O$ and $H_2O$ is heated together in an aqueous solution with the formation of a faujasite. Preliminary to dispersing the faujasite in the siliceous matrix by prior art methods, it is considered essential that the faujasite be first separated from its mother liquor and water-washed until the water in equilibrium with the product is free of soluble salts and amorphous silica. Usually an alkali metal aluminate is used as a source of alumina and, together with an alkali metal hydroxide, as a source of alkali metal ions. The nature of the reaction requires that a considerable excess of silica be employed, the excess being subsequently recovered in the mother liquor and discarded.

It is then an object of this invention to present a novel process for the manufacture of a catalytic composite comprising a faujasite dispersed in an amorphous silica-alumina matrix. It is a further object to present a novel method of dispersing a faujasite in an amorphous silica-alumina matrix whereby the faujasite is employed admixed with its mother liquor. It is still an object to utilize the mother liquor as a source of amorphous silica.

SUMMARY OF THE INVENTION

In one of its broad aspects, this invention embodies a process for the manufacture of a catalytic composite comprising a crystalline aluminosilicate dispersed in an amorphous silica-alumina matrix, which process comprises: (a) preparing a crystalline aluminosilicate dispersed in its mother liquor; (b) rapidly dispersing the crystalline aluminosilicate-mother liquor mixture in an acidified alkali metal silicate solution having a pH in excess of about 2.5, controlling the pH during the faujasite-mother liquor addition so as not to exceed about 4.5, the final pH of the mixture being from about 4.0 to about 4.5, and thereafter effecting gelation of said alkali metal silicate solution; (c) aging the resulting slurry at a pH of from about 5 to about 8 for at least about 0.5 hour and thereafter adjusting the pH to from about 3.5 to about 5.0; (d) separately commingling ammonium hydroxide and aluminum sulfate in a ratio to effect a soluble partial hydrolysis product of said aluminum sulfate and admixing the same with the last mentioned slurry at said pH of from about 3.5 to about 5.0 and thereafter effecting complete hydrolysis of said aluminum sulfate; (e) separating the resulting composite and base-exchanging the same in contact with a solution containing an ion capable of replacing alkali metal ions and characterized by a pH in excess of about 4.5; (f) washing the bash-exchanged product free of soluble matter and drying the resultant catalyst composite.

Other objetcs and embodiments of this invention will become apparent in the following detailed specification.

Pursuant to the process of this invention, a crystalline aluminosilicate is prepared and utilized in its mother liquor. In a preferred embodiment, the crystalline aluminosilicate is a faujasite and the further description of the process of this invention is with respect thereto. The faujasite-mother liquor mixture herein contemplated may be prepared in any conventional or otherwise convenient manner. One preferred method comprises forming an aqueous solution of an alkali metal aluminate and an alkali metal hydroxide and adding said solution to an aqueous silica slurry. The alkali metal hydroxide is usually sodium hydroxide, and the alkali metal aluminate is usually sodium aluminate, a sodium aluminate comprising a $Na_2O/Al_2O_3$ molar ratio of about 1.2 being suitably employed. The resulting reaction mixture preferably comprises a

molar ratio of at least about 0.3 and generally not in excess of about 0.7, and a $SiO_2/Al_2O_3$ molar ratio of from about 6 to about 20—sufficient to yield a faujasite product characterized by a $SiO_2/Al_2O_3$ molar ratio of at least about 3. Preferably, the reaction mixture has a composition expressed in terms of oxide mole ratios as follows:

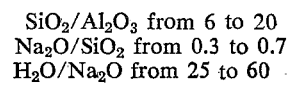

$SiO_2/Al_2O_3$ from 6 to 20
$Na_2O/SiO_2$ from 0.3 to 0.7
$H_2O/Na_2O$ from 25 to 60

In any case, faujasite is crystallized from the reaction mixture at a temperature of from about 65° F. to about 245° F. utilizing a closed vessel to avoid the loss of water. It is preferred to age the reaction mixture for from about 1 to about 24 hours or more at a temperature of up to about 100° F. prior to heating at a higher temperature—usually about 212° F. By so doing, the desired faujasite product is obtained substantially free of other zeolitic material. After the preferred "cold age", the reaction mixture is heated at a higher temperature as aforesaid to effect substantially complete precipitation of the faujasite product from its mother liquor.

The faujasite-mother liquor mixture is thereafter cooled and added to the acidic sodium silicate solution in an amount to insure a final catalyst composite comprising from about 1.0 to about 60 weight percent faujasite dispersed in a silica-alumina matrix, preferably from about 1.0 to about 10 weight percent. The faujasite dispersed in its mother liquor is a highly alkaline mixture. It is preferred to add the alkaline faujasite-mother liquor mixture to an acidic sodium silicate solution having a pH in the lower range, say from about 3.0 to about 4.0 such that the final pH of the reaction mixture is in the aforesaid range of from about 4.0 to about 4.5. The addition should be accomplished as rapidly as possible to avoid undue exposure of the faujasite to the more acidic conditions. The rate of addition is limited only by the efficiency with which the faujasite-mother liquor mixture is dispersed in the acidic sodium silicate solution. Should the alkaline mixture be added too rapidly with inadequate mixing, localized concentrations may occur in the reaction mixture in excess of the desired pH range. This has an adverse effect on the homogeneity of the reaction mixture and ultimately on the uniformity of the final catalyst composite. By an alternative method, the acidic sodium silicate solution may be prepared with an initial pH, say from about 3.5 to about 4.5, and the pH controlled so as not to exceed about 4.5 by adding a suitable acid separately but concurrently with the alkaline faujasite-mother liquor addition.

The acidified alkali metal silicate hereinabove referred to is available by conventional methods of preparation. The alkali metal silicate most often employed is an aqueous sodium silicate sodium commercially available as "water glass." Acidification with a small amount of acid such as hydrochloric acid, sulfuric acid, and the like effects hydrolysis of the water glass and the conversion thereof to a silicic acide or a silica sol. The water glass is usually diluted with water and added to the acid in the diluted state, the final pH being at least about 2.5 and not in excess of about 4.5. To obviate polymerization and premature gelation thereof, the temperature is maintained below about 100° F.

After a suitable period of time has elapsed during which the reaction mixture is permitted to age at the acidic conditions, preferably under conditions of rapid and continuous stirring, whereby the silica is polymerized to a complex polysilicic acid, the slurry is adjusted to a pH of from about 5 to about 8, preferably a pH of from about 7.5 to about 8.5. The reaction mixture is thereafter aged for a time sufficient to develop optimum pore structure of the silica hydrogel, a period of from about 0.5 to about 3 hours being suitable, a period of from about 0.5 to about 1.5 hours being preferred.

After the mixture has been thus aged, the pH is adjusted to a pH of from about 3.5 to about 5.0, preferably from 3.9 to about 4.3 and impregnated with an aqueous solution of a preneutralized aluminum sulfate. The preneutralized aluminum sulfate herein contemplated is a partially hydrolyzed aluminum sulfate. Partial hydrolysis of the aluminum sulfate is suitably accomplished by commingling ammonium hydroxide and aluminum sulfate in a mole ratio of about 4 to 1 and stirring the same together until a solution is obtained. The partial hydrolysis is conveniently effected in aqueous solution, usually by the addition of a dilute aqueous solution of aluminum sulfate to a dilute aqueous ammonium hydroxide solution. The preneutralized aluminum sulfate herein contemplate may be described as aluminum sulfate wherein two of the three sulfate radicals have been replaced with hydroxyl radicals. However, it may very well be that the preneutralized or partially hydrolyzed aluminum sulfate exists as a chemical complex which nevertheless comprises a ratio of about two hydroxyl radicals per aluminum ion present. In any case, the preneutralized aluminum sulfate of this invention is unique with respect to aluminum sulfate and the other hydrolysis products in that it exists in solution to permeate the silica-faujasite slurry at a relatively high pH, and, by virtue of its acquired hydroxy substituents, becomes chemically bound to the silica hydrogel in a fixed relationship prior to gelation to give a more uniform catalyst composition.

It will be appreciated that a selected hydrolysis as herein contemplated is best effected under conditions of rapid stirring and intimate contact of the reactants. Of particular importance to the present invention is the fact that the preneutralized aluminum sulfate can be commingled with the faujasite-silica gel slurry as an alumina source at a higher pH than is normally the case and, in addition, the pH of the slurry is not substantially lowered by the addition of the preneutralized aluminum sulfate so as to be detrimental to the faujasite component during the subsequent acid age.

In the further preparation of the faujasite-silica-alumina catalyst in accordance with the method of this invention, the preneutralized aluminum sulfate is commingled with the faujasite-silica mixture at a pH of from about 3.5 to about 5 and, after a suitable period of acid aging, the preneutralized aluminum sulfate is completely hydrolyzed at an alkaline pH to form a faujasite-silica-alumina composite.

The aged product is thereafter separated from the reaction mixture and base-exchanged in contact with a solution containing an ion capable of replacing alkali metal ions, suitably an ammonium salt solution, and characterized by a pH in excess of about 4.5, so that the final catalyst composite comprises less than about 1.0 weight percent alkali metal. One convenient and preferred method comprises recovering the product as a filter cake. The filter cake is then reslurried or mixed with water to a smooth consistency and subjected to spray drying whereby the aqueous slurry is sprayed in an atomized state into an atmosphere of hot inert gases to effect rapid evaporation of moisture so that dried particles of a predetermined size range fall out of the spray. If so desired, the aforesaid filter cake can be water-washed to concentrate and partially remove soluble salts prior to the spray drying process. Alternatively, the spray dried material can be reslurried and subjected to one or more water-washings to reduce the soluble content to an acceptable level. In any case, the aged hydrogel separated from the aforesaid reaction mixture is treated, preferably with an ammonium salt solution, to remove substantially all of the sodium or other alkali metal ions, and this last mentioned step may be combined with either or both of the aforementioned water-washing steps or may be separate and apart therefrom.

The catalyst composite prepared in accordance with the process of this invention can be composited with any of the several catalytically active metallic materials in the oxidized or reduced state. Of particular interest are the rare earth metals, e.g., cerium, lanthanum, praseodymium, neodymium, illinium, samarium, europium, gadolinium, terbium, dysprosium, holmium, erbium, thulium, scandium, yttrium, lutecium, which are composited with the catalyst by base-exchange methods in the ionic form together with hydrogen ions. Thus, the catalyst composite of this invention can be further treated in contact with an aqueous solution comprising both rare earth cations and hydrogen ions, or hydrogen ion precursors such as ammonium ions which are decomposable to provide hydrogen ions at a temperature below the decomposition temperature of the faujasite. Anions introduced to the composite as a consequence of the base-exchange treatment are suitably separated by water-washing one or more times until free of said ions. The composite is thereafter dried, generally in an air atmosphere, at an elevated temperature, a temperature of from about 150° F. to about 600° F. being suitable. Catalysts thus prepared are particularly effective in the cracking of hydrocarbon feed stocks, such as occur in the gas-oil range of petroleum hydrocarbons, to form lower boiling hydrocarbons in the motor fuel range. Catalytic cracking conditions generally described in the art apply. In particular, a temperature of from about 700° F. to about 1200° F. may be employed and the pressure may range from subatmospheric to several atmospheres. The cracking process can be effected by any of the well-known techniques including a fixed bed type of operation, a moving bed type of operation and, in particular, the well-known fluidized bed type of operation.

Also of interest are those catalysts comprising one or more metals of Group VIB and VIII of the Periodic Table including molybdenum, tungsten, chromium, iron, nickel, cobalt, platinum, palladium, ruthenium, rhodium, osmium, and iridium. Thus, the catalyst composite prepared in accordance with the process of this invention can be utilized advantageously as a catalyst or component thereof to effect a variety of hydrocarbon conversion reactions involving reaction conditions comprising a temperature in the 70–1400° F. range. The catalyst composite of this invention is particularly useful in combination with a hydrogenation component such as nickel together with molybdenum, tungsten, etc., in effecting the hydrocracking of heavy oils, including vacuum residuals, in the presence of hydrogen to form petroleum products in the middle distillate range utilizing a temperature of from about 500° F. to about 1000° F. and pressures of from about 500 p.s.i.g. to about 2500 p.s.i.g. Said hydrocarbon conversion reactions further include polymerization of olefins, particularly ethylene, propylene, 1-butene, 2-butene, iso-butylene, and also higher boiling olefins, at polymerization reaction conditions. The catalyst composite is also useful as a catalyst or component thereof in effecting the alkylation of isoparaffins with olefins or other alkylating agents including, for example, alkyl halides and the like; and also for the alkylation of isobutane, isopentane, and/or isohexane with ethylene, propylene, 1-butene, etc., or mixtures thereof; and also the alkylation of aromatics with olefins or other aylklating agents, particularly the alkylation of benzene, toluene, etc., with propylene, and higher boiling olefins including nonenes, decenes, undecenes, etc., the foregoing alkylation reactions being effected at alkylation conditions disclosed in the art. The products of the process of this invention are further helpful in the isomerization of paraffins, particularly n-butane, n-pentane, n-hexane, etc., and also the isomerization of less highly branched chain saturated hydrocarbons such as the isomerization of 2- or 3-methylpentane, to 2,3- and 2,2-dimethylbutane, isomerization of dimethylcyclohexane to methylcyclohexane, isomerization of methylcyclopentane to cyclohexane, etc., at isomerization reaction conditions. Other hydrocarbon conversion reactions including hydrogen transfer reactions, transalkylation reactions, and the reforming of gasoline or naphtha to improve the anti-knock characteristics thereof, are effectively catalyzed utilizing the catalyst composite prepared in accordance with this method as a catalyst or component thereof.

While the description of the process of this invention has been directed principally to the preparation of faujasite-containing catalyst composites, the described process is applicable to the preparation of similar crystalline alumino-silicate containing catalysts particularly those containing mordenite, chabazite, and the like.

The following example is presented in illustration of one preferred embodiment of this invention and is not intended as an undue limitation on the generally broad scope of the invention as set out in the appended claims.

In the preparation of a faujasite dispersed in its mother liquor, 348.6 grams of sodium aluminate is dissolved in 1672 grams of aqueous sodium hydroxide solution containing 332 grams of sodium hydroxide. The resulting solution is added to a rapidly stirred slurry consisting of 958 grams of powdered silica and 2800 grams of water. This reaction mixture is stirred at about room temperature for about 18 hours and then heated at 203° F. for about 24 hours. The resulting slurry contains 13.1 weight percent faujasite having a $SiO_2/Al_2O_3$ molar ratio of 4.5.

An acidic sodium silicate is prepared by the addition of 22,180 cc. of water glass solution containing 6.9 weight percent $SiO_2$ to 3180 cc. of 25 weight percent sulfuric acid, the final pH being about 2.5. The resulting solution is stirred vigorously and 1530 grams of the faujasite-mother liquor mixture added thereto to yield about 10 weight percent faujasite in the finished product. The final pH is about 3.8 and this is raised to 4.3 by the addition of 15 weight percent ammonia solution. Gelation occurs within about 15 minutes. Stirring is continued for an additional 30 minutes. The pH is then adjusted to 7.5 with 15 weight percent ammonia solution. After one hour aging the pH is adjusted to 4.5 with 25 weight percent sulfuric acid. Thereafter, the preneutralized or partially hydrolyzed aluminum sulfate is added to the stirred slurry which is then aged for 1 hour.

The aforesaid preneutralized aluminum sulfate is prepared by the addition of 1660 cc. of aluminum sulfate solution (88 grams $Al_2O_3$/liter) to a blender containing 408 cc. of a vigorously stirred 28 weight percent ammonia solution and stirring the same together for about 1 minute, the final pH being about 4.0.

The pH of the aforesaid slurry is then adjusted to about 6.5 with 15 weight percent ammonia solution to complete the hydrolysis of the aluminum sulfate. The resulting slurry is then filtered, reslurried to about 10 weight percent solids content and spray dried. The spray dried material is washed with ammonium chloride solution to a sulfate-free level and dried at about 400° F. The composite thus prepared comprises 10 weight percent faujasite dispersed in an amorphous silica-alumina matrix comprising 92.5 weight percent silica and 7.5 weight percent alumina.

We claim as our invention:

1. A process for manufacturing a catalytic composite of a crystalline aluminosilicate dispersed in a silica-alumina matrix which comprises:
    (a) preparing a crystalline aluminosilicate dispersed in its mother liquor,
    (b) rapidly dispersing the crystalline aluminosilicate-mother liquor mixture in an acidified alkali metal silicate solution having a pH in excess of about 2.5, controlling the pH during the addition so as not to exceed about 4.5, the final pH of the mixture being from about 4.0 to about 4.5, and effecting gelation of said alkali metal silicate solution,
    (c) aging the resulting slurry at a pH of from about 5 to about 8 for at least about 0.5 hour and thereafter adjusting the pH to a pH of from about 3.5 to about 5.0,
    (d) separately commingling ammonium hydroxide and aluminum sulfate in a ratio to effect a soluble partial hydrolysis product of said aluminum sulfate and admixing the same with the last mentioned slurry at said pH of from about 3.5 to about 5.0; and thereafter effecting complete hydrolysis of said aluminum sulfate,
    (e) separating and base-exchanging the resulting composite in contact with a solution containing ions capable of replacing alkali metal ions and characterized by a pH in excess of about 4.5,
    (f) washing the base-exchanged product free of soluble matter and drying the resulting composite.

2. The process of claim 1 further characterized with respect to step (a) in that said crystalline aluminosilicate is a faujasite.

3. The process of claim 2 further characterized with respect to step (a) in that said faujasite has a silica-alumina ratio of at least about 3.

4. The process of claim 3 further characterized with respect to step (b) in that said faujasite-mother liquor mixture is dispersed in an acidified alkali metal silicate solution having a pH in excess of about 3.0 and less than about 4.0, the pH being controlled during the faujasite-mother liquor addition so as not to exceed about 4.5, the final pH of the mixture being from about 4.0 to about 4.5.

5. The process of claim 4 further characterized with respect to step (b) in that said gelation is effected at a temperature of from about 70° F. to about 110° F.

6. The process of claim 5 further characterized with respect to step (c) in that said slurry is aged at a pH of from about 7.5 to about 8.5 for a period of from about 0.5 to about 1.5 hours.

7. The process of claim 6 further characterized with respect to step (d) in that said partial hydrolysis product is prepared by commingling ammonium hydroxide and aluminum sulfate in a mole ratio of about 4 to 1.

8. The process of claim 7 further characterized with respect to step (d) in that said partial hydrolysis product is admixed with said slurry at a pH of from about 3.9 to about 4.3.

9. The process of claim 8 further characterized with respect to step (f) in that said composite is base-exchanged with said solution whereby the alkali metal content is reduced to less than about one weight percent of said product.

References Cited

UNITED STATES PATENTS

| | | | |
|---|---|---|---|
| 3,169,931 | 2/1965 | De Rosset et al. | 252—453 |
| 3,207,701 | 9/1965 | Curtin | 252—451 |
| 3,329,628 | 7/1967 | Gladrow et al. | 252—453 |
| 3,352,796 | 11/1967 | Kimbertin, et al. | 252—455 |
| 3,410,808 | 11/1968 | Smith et al. | 252—453 |

DANIEL E. WYMAN, Primary Examiner

C. F. DEES, Assistant Examiner

U.S. Cl. X.R.

252—455